W. G. LESSERT & B. S. McWILLIAMS.
AUTOMOBILE TRANSMISSION.
APPLICATION FILED DEC. 3, 1915.

1,202,296.

Patented Oct. 24, 1916.
2 SHEETS—SHEET 1.

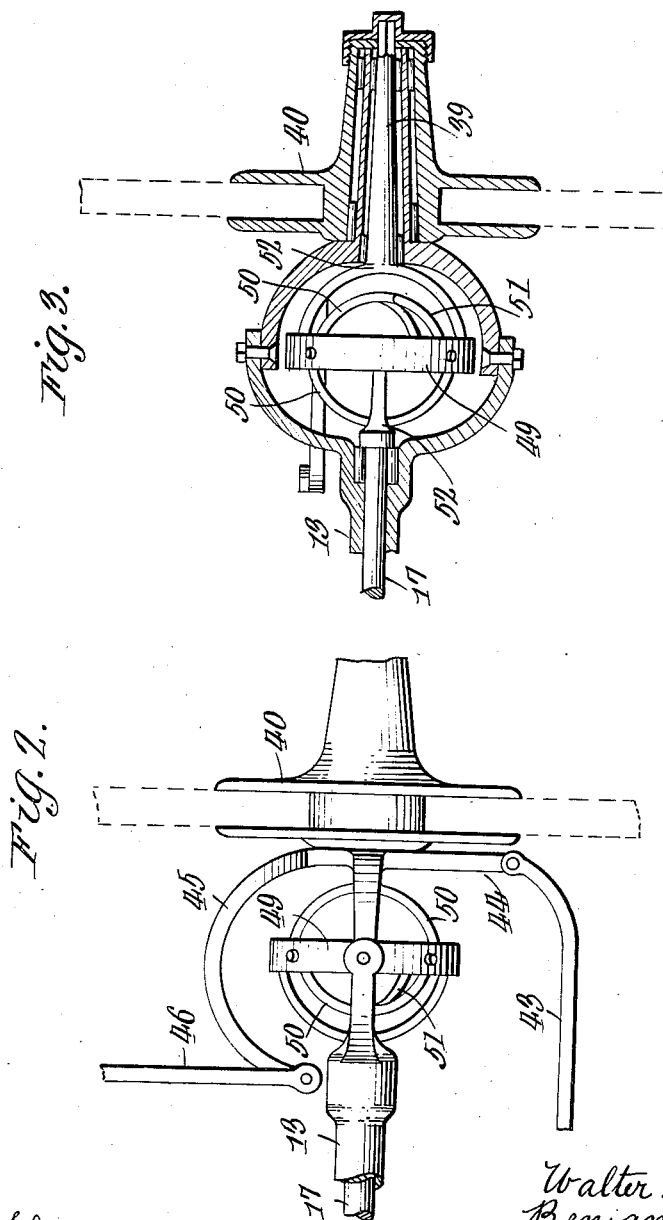

UNITED STATES PATENT OFFICE.

WALTER G. LESSERT AND BENJAMIN S. McWILLIAMS, OF GORDON, NEBRASKA.

AUTOMOBILE TRANSMISSION.

1,202,296.

Specification of Letters Patent.   Patented Oct. 24, 1916.

Application filed December 3, 1915.   Serial No. 64,874.

*To all whom it may concern:*

Be it known that we, WALTER G. LESSERT and BENJAMIN S. McWILLIAMS, citizens of the United States, residing at Gordon, in the county of Sheridan and State of Nebraska, have invented certain new and useful Improvements in Automobile Transmissions, of which the following is a specification.

This invention relates to an improved automobile transmission and the principal object of the invention is to provide a transmission so constructed that the machine may be driven from the front axle as well as from the rear axle.

Another object of the invention is to provide improved means for transmitting rotary motion from the engine shaft to the axles.

Another object of the invention is to so construct the shafts leading from the axles that one may be rotated independent of the other thus permitting the machine to be driven from one axle in case the transmitting shaft leading to the second axle should become broken.

This invention is illustrated in the accompanying drawings, wherein:—

Figure 1 is a view in plan showing the transmission applied to an automobile, certain portions of the machine and transmission being shown in section. Fig. 2 is a top plan view of one end portion of the front axle. Fig. 3 is a longitudinal sectional view of the end portion of the front axle shown in Fig. 2.

In Fig. 1 there is shown the frame work 10 of an automobile. This frame work carries the cross bars 11 and 12 and also carries the axle casings 13 and 14. The casings are each provided with an enlargement which provides a housing 15 for the front axle casing and a housing 16 for the rear axle casing. The front and rear axles 17 and 18 extend through the casings 13 and 14 and are provided with the usual differentials 19 and 20 positioned in the housings 15 and 16. These differentials 19 and 20 are provided with collars formings gear plates 21 and 22 with which the gears 23 and 24 engage. Gears 23 and 24 are mounted upon the shafts 25 and 26 which shafts are connected with the sub-shafts 27 and 28 by means of universal joints 29 and 30. A housing 31 is carried by cross bar 12 and is provided with openings through which the shafts 27 and 28 extend, the inner ends of the shafts mentioned being connected with the differential 31'. This differential 31' carries a gear 32 which is positioned between similar gears 33 and 34 as clearly shown in the drawings.

The shaft 35 which is connected with the shaft of the engine 35' is rotatably mounted in the walls of housing 31 and carries a gear 36 which is slidably mounted but turns with the shaft 35. Any suitable shifting means may be provided for moving the gear 36 to engage gear 32 or selectively engage 36 to engage gear 33 or 34. When this gear 36 engages gear 32 both shafts 25 and 26 will be rotated and thus the automobile driven from both axles. If shaft 25 or 26 should be broken or if for any other reason it is desired to drive from only one axle, the gear 36 will be shifted to mesh with the proper gears 33 or 34 and only one axle will then be rotated from the engine. The rear axle carries supporting wheels 37 which are provided with the usual brake drums 38 and the front axle 17 is connected with the spindles 39 which carry the supporting wheel 40.

In order to properly mount the front wheels there have been provided universal joints indicated in general by the numeral 41 in Fig. 1 and in order to permit the wheels to be turned simultaneously when guiding there has been provided a connecting rod or bar 43 which extends across the machine and has its ends connected with the arms 44. An arm 45 leads from one of the wheels and is connected with the steering shaft or rod 46. The construction of the universal joint is more clearly shown in Figs. 2 and 3. The universal joints which connect the spindle with the front axle are constructed in a manner similar to the universal joints 29 and 30 and also similar to the construction of the universal joints 47 and 48 positioned between the housing 31 and engine 35. The band 49 which forms part of the joints is provided with openings in which U-shaped knuckles 50 are pivotally mounted. These knuckles are positioned at right angles to each other and carry inner U-shaped yokes 51 extending diagonally of the knuckles 50 but at right angles to each other. These yokes have their inner end portions passing through openings formed in the arms of the brackets 52 which brackets lead from the axle and spindle or are connected with the two sections of the shafts shown in Fig. 1.

Therefore the wheels may assume the proper position with respect to the road over which the machine travels.

The operation of this machine will be readily understood from an inspection of Fig. 1. In Fig. 1 the mechanism is shown in the normal position with the sliding gear of the transmission meshing with the gear 32. In this position both the front and rear axles will be rotated and thus both of the axles will be driving axles. If shaft 25 or 26 breaks or if for any reason it is desired to only drive from one axle the sliding gear will be moved to engage gear 33 or 34 and thus axle 17 or axle 18 alone may be used as the driving axle.

What is claimed is:

1. An automobile comprising a frame, a driving element, axle casings carried by said frame and provided with housings positioned intermediate their length, forward and rear axles rotatably mounted in said casings and provided with differentials positioned in said housings, the differentials being provided with collars forming gear plates, a housing positioned intermediate the length of said frame, a driven shaft having its end portions extending into the housings of said axle casings and provided with gears meshing with the gear plates of the differentials positioned therein, the intermediate portion of said driven shaft extending into the housings carried by said frame, and provided with a differential, a gear carried by said last mentioned differential, gears carried by said driven shaft upon opposite sides of said differential, a driving shaft, and a gear slidably carried by said driving shaft and selectively engaging the gears of said driven shaft.

2. An automobile including a frame, axles, differentials for said axles provided with collars constituting gear plates, a housing carried by said frame, a driven shaft passing through said housing, gears connected with said driven shaft and meshing with the gear plates of said differential, a differential for said driven shaft, positioned within said housing and provided with a gear, gears carried by said driven shaft upon opposite sides of a differential thereof, a driving shaft extending into said housing, and a gear slidably mounted upon said driving shaft to rotate with the same and meshing with the gear of the driven shaft differential or with a selected one of the gears carried by said driven shaft upon opposite sides of the differential thereof.

3. An automobile comprising a frame, axles, differentials for said axles provided with gear plates, a driven shaft provided with gears meshing with the gears of said differentials, a differential for said driven shaft provided with a gear, gears carried by said driven shaft upon opposite sides of said last mentioned differential, a driving shaft rotatably mounted adjacent said driven shaft, and a gear slidably mounted upon said driving shaft to rotate with the same and meshing with the gear of the last mentioned differential or with a selected one of said last mentioned gears.

4. An automobile including a frame, axles, a driven shaft extending longitudinally of the frame, means for transmitting rotary motion from said driven shaft to said axles, a differential for said driven shaft provided with a gear, gears carried by said driven shaft upon opposite sides of the differential thereof, a driving shaft extending longitudinally of the frame, and means for transmitting rotary motion from said driving shaft to said driven shaft through selective engagement with the gear of the differential of the driven shaft and the gears carried by said driven shaft.

5. A transmission of the character described comprising a driving shaft, a driven shaft extending parallel to said driving shaft provided with a differential, a gear carried by the differential of said driven shaft, gears carried by said driven shaft upon opposite sides of said differential, a gear adjustably mounted upon said driving shaft for longitudinal movement thereon and meshing with the gear of said differential or with a selected one of the gears carried by said driven shaft, and axles extending transversely of said driven shaft and rotated therefrom.

In testimony whereof we affix our signatures in presence of a witness.

WALTER G. LESSERT.
BENJAMIN S. McWILLIAMS.

Witness:
JOHN W. TERRILL.